United States Patent [19]

Kaye

[11] Patent Number: 4,514,085
[45] Date of Patent: Apr. 30, 1985

[54] MARKING AND AUTHENTICATING DOCUMENTS WITH LIQUID CRYSTAL MATERIALS

[75] Inventor: Wilbur I. Kaye, Corona del Mar, Calif.

[73] Assignee: Beckman Instruments, Inc., Fullerton, Calif.

[21] Appl. No.: 392,838

[22] Filed: Jun. 28, 1982

[51] Int. Cl.³ .......................... G06K 7/10; G06K 9/74
[52] U.S. Cl. ..................................................... 356/71
[58] Field of Search ............. 356/71; 350/331 R, 349, 350/351

[56] References Cited

U.S. PATENT DOCUMENTS

| | | | |
|---|---|---|---|
| 3,480,785 | 11/1969 | Aufderheide | 250/219 |
| 3,873,813 | 3/1975 | Lahr et al. | 356/71 X |
| 4,006,414 | 2/1977 | Parker | 350/351 X |
| 4,435,047 | 3/1984 | Fergason | 350/347 V |

Primary Examiner—Vincent P. McGraw
Attorney, Agent, or Firm—W. H. May; P. R. Harder; S. R. Markl

[57] ABSTRACT

Method and apparatus for authenticating documents such as government notes and currency, stock certificates, and the like by marking the document with an encapsulated dyed liquid crystal material and examining the document for unique optical characteristics of the mark. Reading apparatus for the document measures changes in reflectivity of the liquid crystal mark with changes in an electrical field applied thereto. In other embodiments, reflectivity is measured at a plurality of different wavelengths. In one embodiment, the dye absorbs in regions of the electromagnetic spectrum "invisible" to the human eye and the reading apparatus monitors reflectivity changes at these invisible wavelengths.

14 Claims, 4 Drawing Figures

MARKING AND AUTHENTICATING DOCUMENTS WITH LIQUID CRYSTAL MATERIALS

BACKGROUND OF THE INVENTION

1. Field of the Invention

The present invention relates to the use of liquid crystal materials for marking and authenticating documents. The invention is particularly suited for, but not limited to, use with documents subject to counterfeit such as government certificates, notes, and currency, stock certificates, bank notes and the like.

2. Description of the Prior Art

Liquid crystal materials have found widespread application in eye-readable displays as are found, for example, in digital watches, calculators, and the like. Considerable effort has been expended to develop liquid crystal materials which exhibit a high level of visual contrast. To this end, guest dyes have been linked to host liquid crystals to tailor the absorption or transmittance properties of the liquid crystal. See "High Order Parameter Anthraquinone Dye", A. Pearson and I. C. Sage, Chemical Development Research Department, B. D. H. Chemicals Ltd., Poole Dorset, England, June, 1981. In addition, it is known that liquid crystal materials can be protected by encapsulation. For example, see U.S. Pat. No. 3,585,381 teaching use of encapsulated liquid crystal materials in thermal imaging and other display applications.

SUMMARY OF THE PRESENT INVENTION

In accordance with the present invention, liquid crystal materials are employed for marking documents or other samples (hereinafter referred to collectively as "documents") in a manner which enables authentication of the document by examination of the document for predetermined characteristics of the liquid crystal material. A particular application of the invention is in marking and authenticating documents subject to counterfeit such as government certificates, notes or currency, bank notes, stocks, bonds, paintings and other important documents.

To the foregoing end, the present invention contemplates a method and apparatus for authenticating documents comprising the steps of applying a liquid crystal material to the document or sample, which material exhibits a predetermined response to an external stimulus and examining the document for the response characteristic of the liquid crystal material. In a preferred form, the liquid crystal material is linked with a dye, encapsulated, and applied to the document. Authentication of the document is dependent on the unique electro-optic properties of the liquid crystal material and the spectral properties of the dye. The dye may absorb in either the visible or invisible portion of the electromagnetic spectrum.

The invention further contemplates directing a beam of radiation at the document and measuring the radiation reflected from the document in one or more selected wavelength region established by the properties of the liquid crystal material and dye. Moreover, the document is subjected to an externally applied field which causes a change in molecular orientation of the liquid crystal molecules and hence a corresponding change in the absorption of the dye. As a result, the intensity of reflected radiation from the document in the selected wavelength region or regions varies with changes in the applied field. This characteristic change in response with change in the applied field indicates the presence of the particular liquid crystal material and hence serves to authenticate the document.

In accordance with a further aspect of the invention, a reader for authenticating the document comprises a read station for receiving the document, means for directing a beam of radiation along an optical axis toward the read station and means for detecting radiation received from the read station along the optical axis. The apparatus further comprises a pair of electrodes for applying an electrical field across the document (and liquid crystal material applied thereto) and means for changing the value of the field so applied. The document is monitored for radiation reflected in one or more wavelength regions established by the properties of the liquid crystal material and dye. The intensity of the detected radiation in such region or regions is a function of the field applied to the document. As a result, a predetermined change in reflected light level at the one or more selected wavelengths for a corresponding change in the strength of the applied field serves to indicate the presence of the particular liquid crystal material on the document and hence serves to authenticate the document.

DESCRIPTION OF THE PREFERRED EMBODIMENTS

Figure 1:
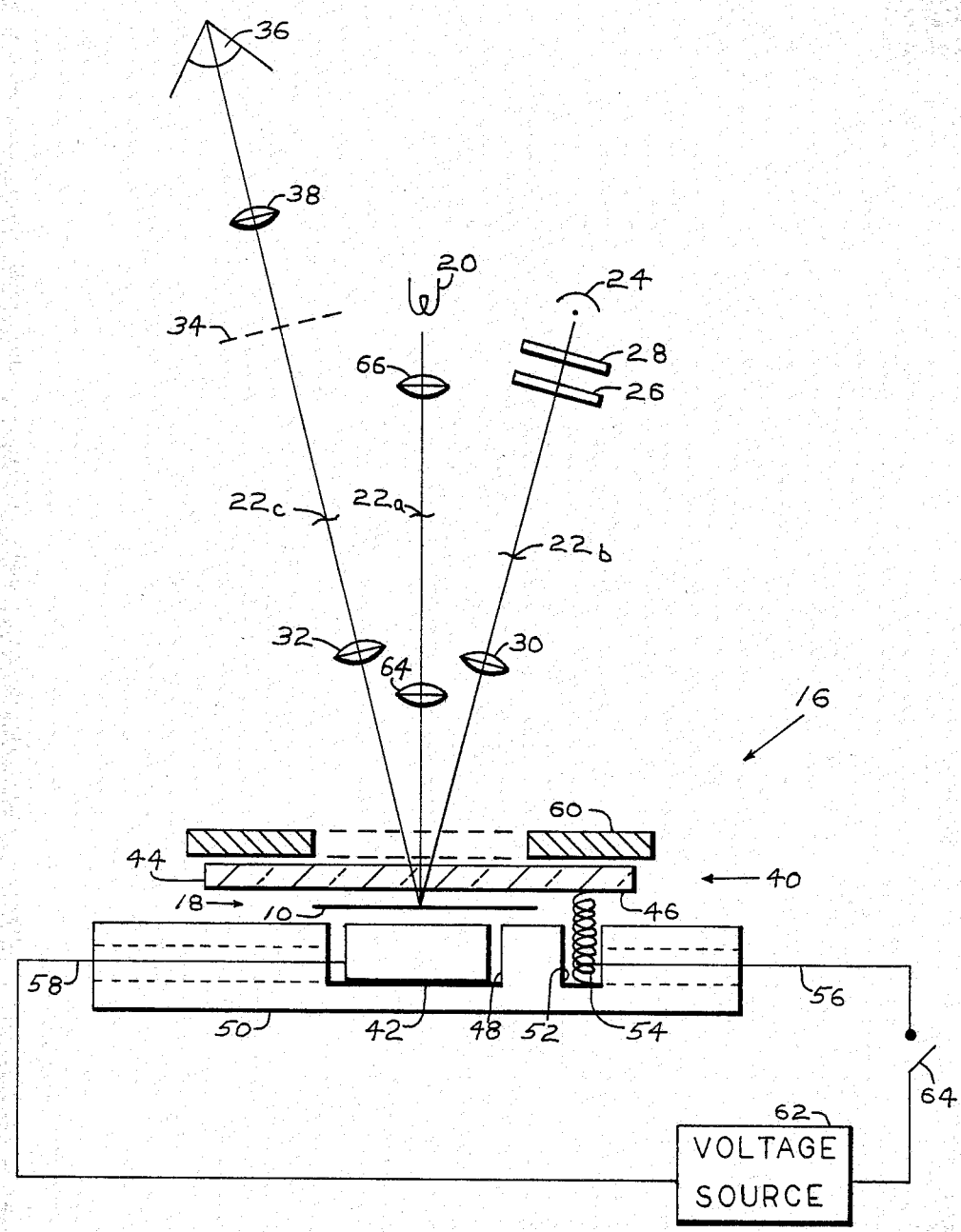
FIG. 1 is an optical diagram of apparatus for authenticating documents in accordance with the present invention.

FIG. 1 illustrates apparatus for identifying and authenticating a document in accordance with the present invention.

Figure 2:
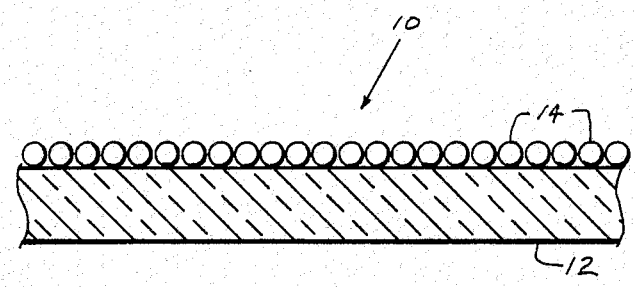
FIG. 2 is a fragmentary, sectional view of a document marked with an encapsulated liquid crystal material in accordance with the present invention.

In FIG. 2, the illustrated document 10 comprises a thin plastic (polycarbonate) Nuclepore filter 12 carrying a thin layer of encapsulated liquid crystal material 14. By way of example only, the liquid crystal material may be a eutectic nematic mixture of the cyanobiphenyl type known as type E-63 and having a positive dielectric anisotropy. In the illustrated form, the liquid crystal material contains a pleochroic anthraquinone dye available under the trade number D80. The dye has an absorption maximum at 456 nm and hence appears yellow to the eye. Such dyed liquid crystal materials are manufactured by BDH Chemicals Ltd. of Poole, Dorset, England, and are commercially available from E. M. Chemical Company, No. 5 Skyline Drive, Hawthorne, N.Y. 10532.

The liquid crystal material is encapsulated within cross-linked gelatin capsules of generally spherical configuration. Capsule diameter ranges from about three to about 50 $\mu$m. Such encapsulation of liquid crystal material may be commercially obtained from Djinni Industries, Inc., 158 E. Helena St., Dayton, Ohio 45404.

Deposition of the encapsulated liquid crystal capsules onto the Nuclepore filter 12 was accomplished by filtering a dispersion through the filter. The result was to deposit a thin contiguous layer of liquid crystal capsules about one capsule diameter in thickness onto the upper surface of the filter. The filter itself is about one mil in thickness.

The layer of liquid crystal capsules 14 may be sprayed with a lacquer (not shown) that is nonconducting, transparent, and of high dielectric constant. The lacquer coating protects the capsules, conducts a field into the liquid crystal material, and reduces light scattering from the capsules.

In a preferred form the encapsulated liquid crystal material is dispersed and incorporated in a printing medium or binder such as ink in which the liquid crystal material serves as the pigment. In this form the encapsulated liquid crystal material is readily "printed" on a document.

FIG. 1 illustrates apparatus 16 for authenticating a document such as that illustrated in FIG. 2. The authenticating apparatus or reader 16 comprises a read station 18 for receiving the document 10 for authentication and a light source 20 for directing a beam of radiation toward the read station along an optical path 22a. Light source 20 may be a Nicholas luminator which emits white radiation. It is preferred that the source be operated on d.c. power to avoid an a.c. component in the light reflected from the sample. Lenses 66 and 64 direct the radiation from the source onto the document 10.

A binocular microscope such as a modified Bausch & Lomb stereozoom microscope (B&L Cat. No. 31-26-29-12) may be employed to monitor radiation reflected from document 10 along optical axes 22b and 22c. Axis 22b terminates in one eyepiece of the microscope in which is mounted a silicon photodetector 24 and associated preamplifier (Hamamatsu type S1406-03 not shown). Filters 26 and 28 restrict the wavelengths of light reaching the silicon detector to an interval of 457.4±10.0 nm. Filter 26 may be a blue filter for blocking near infrared radiation. Filter 28 is an interference filter for only passing radiation in the desired wavelength interval to detector 24. An objective lens 30 along axis 22b of the microscope forms a magnified image of the sample 10 onto the surface of the silicon detector 24.

Similarly, lens 32 along axis 22c forms an image of document 10 at 34 for viewing by the eye 36 of an observer. Ocular lens 38 further magnifies the image at 34 for viewing by eye 36. The components of optical path 22c enable an observer to view and align the predetermined area of the document 10 for viewing by detector 24.

At the read station 18, the document 10 is compressed between upper and lower electrodes 40 and 42. Upper electrode 40 comprises a nonconducting glass plate 44 on the bottom surface of which is coated, transparent conducting layer 46 of tin oxide which contacts the document. Lower electrode 42 comprises a conducting stainless steel button on which the document is positioned. The lower electrode is received within a well 48 in the upper surface of a nonconducting plastic support block 50. A second well 52 in block 50 receives a conductive spring 54 the upper end of which engages conductive layer 46 of upper electrode 40. Electrical connection is provided to lower electrode 42 via conductive lead 58 connected thereto and to upper electrode 40 via electrical lead 56 connected to conductive spring 54.

The document 10 is held in compressive engagement with the upper and lower electrodes 40 and 42 by a weighted annular brass ring 60 which applies a downward gravitational force sufficient to compress the sample between the upper and lower electrodes. For clarity of illustration, FIG. 1 depicts document 10 and electrodes 40 and 42 in an exploded, non-contacting orientation.

Reader 16 further comprises a voltage source 62 connected to conductors 56 and 58 for impressing an electrical field as an external stimulus across the document 10 (and hence across the encapsulated liquid crystal material 14 thereon) and switching means 64 for changing the value of the applied field by alternately connecting and disconnecting source 62. In this regard, source 62 supplies a 135 volt 60 Hz sinusoidal signal. Molecular orientation of the liquid crystal molecules changes with changes of the applied field strength. The pleochroic dye molecules align themselves with the liquid crystal molecules. As a result, with radiation from source 20 impinging on document 10, the intensity of the radiation reflected by the document changes with field strength. With no field applied (switch 64 open), reflectivity is typically less than ten percent. With the field applied (switch 64 closed), reflectivity is typically greater than twenty percent. Consequently, an electrical field of moderate magnitude modulated or switched off and on causes substantial change in the reflectance exhibited by the encapsulated and dyed liquid crystal layer 14 applied to document 10. This characteristic change in reflectance measured by detector 24 for changes in the applied field strength indicates the presence of the particular liquid crystal material 14 on the document and hence serves to authenticate the document.

Switch 64 may be manually switched on and off in the foregoing measurements. Alternately, the switch may be automatically operated, i.e. modulated, by means conventional in the art. Modulation frequencies in the range from near zero (i.e. d.c.) up to 1.0 KHz or more are satisfactory.

In lieu of the electric field impressed across document 10, a magnetic field could be employed.

Air gaps in a document may pose a problem since a disproportionate fraction of the applied field will appear across an air gap. Only the field across the encapsulated liquid crystal is of consequence. As a result, it is desirable to minimize any air gap by compressing the electrodes together (as with weighted brass ring 60). Another method of eliminating an air gap is to immerse the sample in a nonconducting liquid such as mineral oil.

Figures 3, 4:
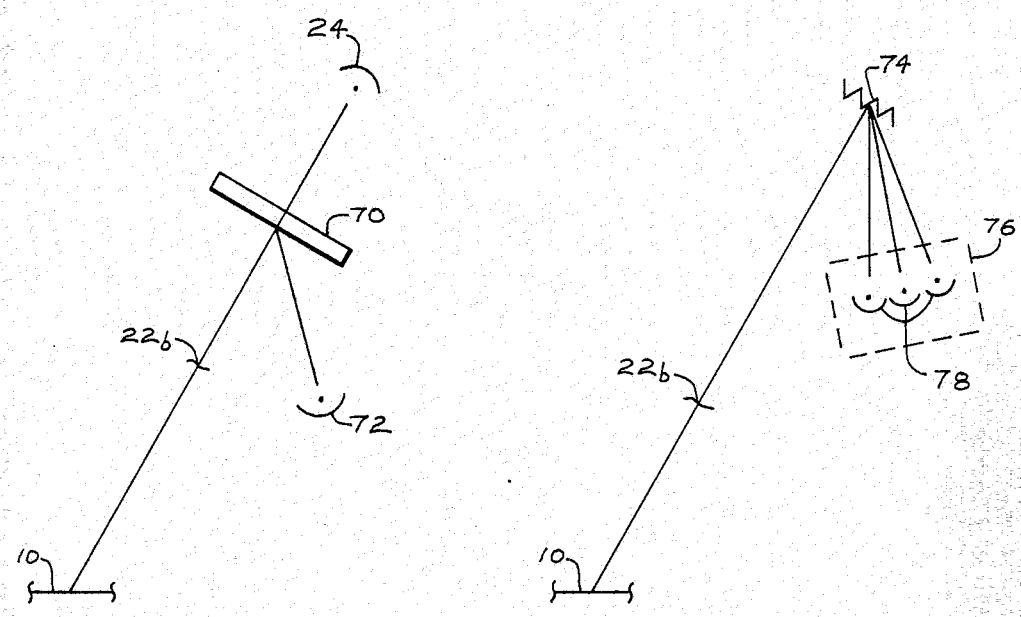
FIGS. 3 and 4 are an optical diagrams of part of the FIG. 1 apparatus modified in accordance with further embodiments of the invention.

FIGS. 3 and 4 illustrate modifications of the FIG. 1 apparatus for measuring reflectivity of the document 10 at a plurality of wavelengths. The FIG. 3 apparatus comprises a dichroic filter 70 in optical path 22b and a second photodetector 72 receiving radiation reflected from filter 70. The dichroic filter is selected to pass radiation in a first wavelength interval to first detector 24 and to reflect radiation in a second wavelength interval to detector 72. In this manner, the change in reflectivity of the dyed liquid crystal material in a plurality of wavelength intervals is obtained and the document is authenticated only if the response in each wavelength interval corresponds to the appropriate response for that liquid crystal material and dye.

The FIG. 3 apparatus is particularly useful for authenticating documents such as currency which inevitably become soiled and dirty. In this regard, the dyed liquid crystal material applied to such bills has a large order change in optical absorbance with change in liquid crystal molecule orientation at one wavelength and a near zero order change at a second wavelength. Any soiling of the bills affects the reflectivity essentially equally at the two wavelengths. Accordingly, such a document is authenticated by measuring the change in reflectivity at two or more wavelengths and comparing (e.g. by rationing) the measurements at the wavelengths. The document is authenticated when these measurements bear a predetermined relationship to each other characteristic of the particular dye. For this purpose, the FIG. 3 apparatus further includes a comparator (not shown) receiving as separate inputs thereto the output signals of first detector 24 and second detector 72.

FIG. 4 illustrates a further embodiment for measuring reflectivity of the document 10 at a plurality of wavelengths. For this purpose, the apparatus includes diffraction grating 74 in optical path 22b and an array detector 76 comprised of a plurality of individual detectors 78. The diffraction grating separates radiation from document 10 into a plurality of selected wavelength intervals and directs the radiation in each interval to predetermined respective individual detectors of detector array 76.

In accordance with a further aspect of the invention, the dye incorporated in the liquid crystal material may absorb in a nonvisible portion of the spectrum such as the ultraviolet or infrared range. Such dyes are invisible to an observer and hence serve to increase the security of the marking and authentication system. With such an invisible dye the detector 24 is tailored to respond to the "invisible" wavelengths (e.g. in the ultraviolet or infrared regions) at which the dye absorbs. Triphenyl is a suitable dye for this purpose.

Moreover, security can be increased by applying or printing the dyed liquid crystal material on the document in a manner which encodes a particular message, such as denomination or serial number, and which requires decoding to authenticate the sample. Further, the document may be printed in two or more areas using dyed liquid crystal materials of different spectral character. Moreover, while several preferred embodiments have been illustrated and described, various modifications may be made therein without departing from the invention defined by the appended claims.

What is claimed is:

1. A method of repeatably authenticating documents comprising the steps of:
   (1) applying a liquid crystal material to the document, which material exhibits a predetermined response to an electrical or magnetic stimulus, and
   (2) examining the document for detectable characteristics of the predetermined response of the liquid crystal material when said stimulus is applied.

2. The method of claim 1 including the further step of encapsulating the liquid crystal material before application to the document.

3. A method of claim 2 including the further step of combining a dye with the liquid crystal material prior to encapsulation thereof.

4. The method of claim 3 wherein the dye combined with the liquid crystal material absorbs radiation in a visible region of the electromagnetic spectrum.

5. The method of claim 3 wherein the dye absorbs radiation in the invisible region of the electromagnetic spectrum.

6. The method of claim 5 wherein the dye comprises triphenyl.

7. The method of claim 3 wherein the step of examining comprises the further steps of (1) directing a beam of radiation at the document, and (2) measuring the radiation reflected from the document.

8. The method of claim 7 wherein the step of examining further includes the steps of:
   (1) subjecting the document to an externally applied field causing said predetermined response in the liquid crystal material;
   (2) changing the value of the applied field; and wherein the step of measuring includes:
   measuring the radiation reflected from the document or sample for different values of the applied field.

9. The method of claim 3 wherein the dye combined with the liquid crystal material absorbs radiation in an identifiable region of the electromagnetic spectrum.

10. Apparatus for authenticating documents marked with an encapsulated liquid crystal matrial and dye comprising:
    means forming a read station for receiving the document or sample;
    means for directing a beam of radiation along an optical axis toward the read station;
    means for detecting radiation received from the read station along the optical axis;
    means for applying a field across the document;
    means for changing or modulating the value of the applied field; and
    means for comparing the values of detected radiation for different values of the applied field.

11. The apparatus of claim 10 wherein the field applying means comprises first and second conductors disposed on opposite sides of the document and means for urging the conductors into compressive engagement with the document.

12. The apparatus of claim 10 further comprising means for isolating a plurality of wavelengths of radiation passing from the read station and wherein the detecting means includes a plurality of detectors responsive, respectively, to radiation at the plurality of wavelengths.

13. The apparatus of claim 12 further including means for comparing the responses of the plurality of detectors.

14. A method of authenticating documents comprising the steps of:
    (1) applying a liquid crystal material to the document, which material exhibits a predetermined response to an external electrical or magnetic stimulus,
    (2) applying said external stimulus to said document, and
    (3) examining the document for a detectable characteristic of the response of the liquid crystal material.

* * * * *